Feb. 25, 1964  F. SINGER  3,122,078
PHOTOGRAPHIC CAMERA
Filed Feb. 23, 1962  6 Sheets-Sheet 1
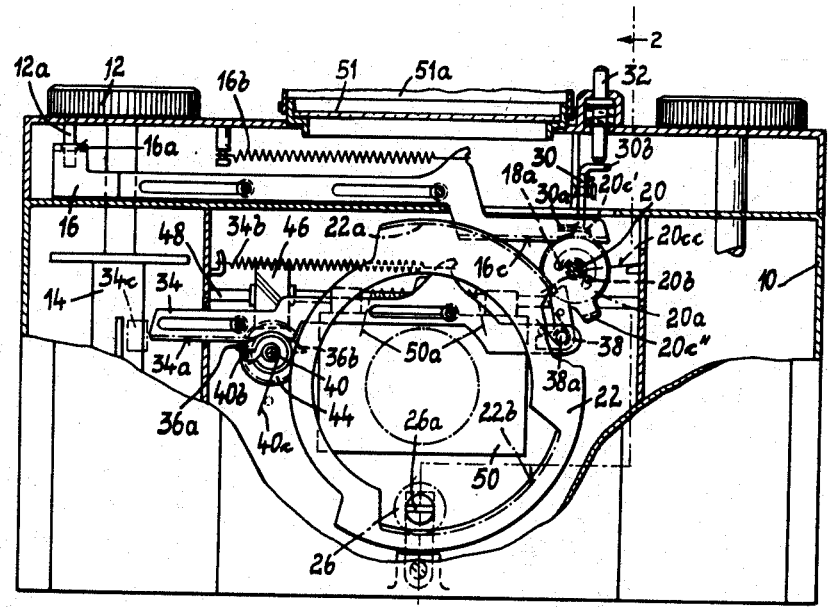
Fig.1
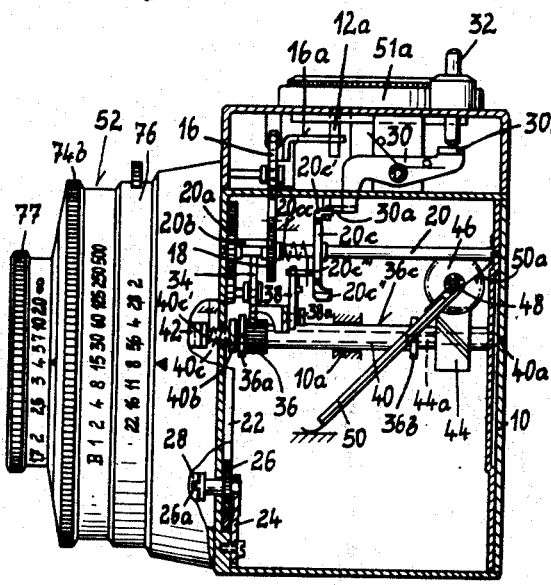
Fig.2
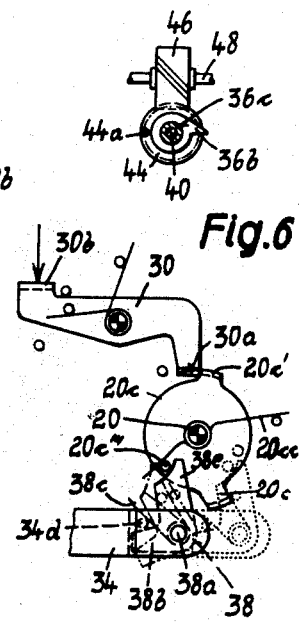
Fig.6
Fig.3

3,122,078
PHOTOGRAPHIC CAMERA
Franz Singer, Munich, Germany, assignor to Compur-Werk G.m.b.H. & Co., Munich, Germany, a firm of Germany
Filed Feb. 23, 1962, Ser. No. 174,935
Claims priority, application Germany Feb. 24, 1961
7 Claims. (Cl. 95—42)

This invention relates to a photographic camera, and more particularly to a camera of the single lens reflex type having an objective shutter. In such a camera, as well known in the art, there is a pivoted mirror within the camera body, which is swung into viewing position to enable viewing of the scene to be photographed, the shutter blades and the diaphragm leaves being fully open at this time. The viewing mirror may serve as sufficient protection for the sensitized film, when the mirror is in viewing position, or there may be a separate flap or film protecting member associated with the mirror. When the exposure is to be made, the shutter blades are first closed, then the mirror (and the separate protecting flap, if one is used) are swung to their ineffective positions where they do not obstruct passage of light from the lens to the film, and then the shutter blades are opened and closed to make the actual exposure.

Cameras of this general type are well known in the art. In many of the prior constructions, the mirror remains in its ineffective position after the exposure is completed, until the camera shutter is tensioned or cocked ready for the next exposure. This is a disadvantage, since the photographer frequently wishes to view the scene again in the viewfinder, immediately upon completion of the exposure, to see whether conditions may have changed during the making of the exposure so that a new exposure would be desirable.

An object of the invention is the provision of a generally improved and more satisfactory camera of the general type above mentioned.

Another object is the provision of a camera having improved and more satisfactory controlling and operating mechanism for operating the mirror and the shutter blades in preparation for an exposure and at the conclusion of the exposure.

Still another object is the provision of improved and simplified mechanism for opening the shutter blades and diaphragm leaves and moving the mirror to viewing position immediately at the conclusion of an exposure, so that the operator may immediately view the scene he has just photographed, without waiting to cock or tension the mechanism ready for the next exposure.

A further object is the provision of improved and reliable mechanism for opening the shutter blades for viewing purposes by means of motion imparted to the regular blade ring, without requiring a separate blade bearing ring as is required in certain prior constructions of this same general type.

These and other desirable objects may be attained in the manner disclosed as an illustrative embodiment of the invention in the following description and in the accompanying drawings forming a part hereof, in which:

FIG. 1 is a front elevation of a camera according to the present invention, with parts broken away and parts in vertical section;

FIG. 2 is a vertical section through the camera, mainly taken approximately on the line 2—2 of FIG. 1;

FIG. 3 is a somewhat schematic view of part of the mechanism shown in FIG. 1, on a larger scale;

FIG. 6 is a detail of part of the mechanism shown in FIGS. 1 and 2;

Figure 4:
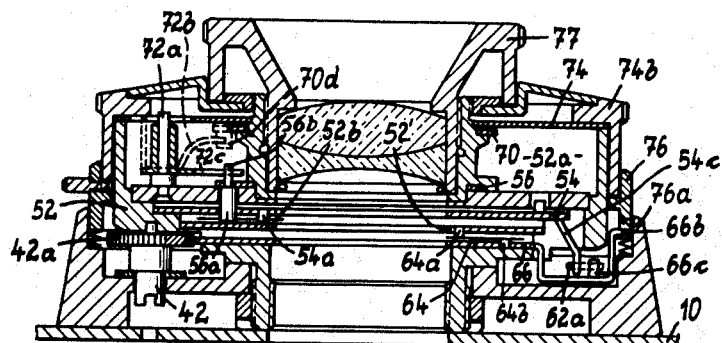
FIG. 4 is an axial diametrical section through one form of shutter mechanism useful with the camera shown in FIGS. 1 and 2.

Referring now to FIGS. 1–6 of the drawings, the single lens reflex camera indicated in general at 10 has a film winding knob 12 which, in conventional manner, serves to wind the exposed film onto a spool 14. The winding knob 12 carries a pin 12a arranged eccentrically with respect to the axis of rotation of the knob, engaging in a transverses lot 16a in slide 16, serving to move the slide longitudinally when the knob is rotated to feed or transport the film. The slide moves in the camera body in a direction parallel to the focal plane of the film (or the image plane, as it may be called) and is biased by a spring 16b urging it to return leftward to the rest position shown in FIG. 1.

Rotation of the film winding knob 12 displaces the slide 16 rightwardly from the position shown in FIG. 1, so that rack teeth 16c formed on the righthand end of the slide 16 mesh with and turn a pinion 18 rotatably mounted on a shaft 20 extending within the camera body and parallel to the optical axis. Another pinion 20a and a crank disk 20c are both fixed to the shaft 20 so as to turn together. The second pinion 20a carries a pin 20b fixed to it, parallel to and offset laterally from the shaft 20, the end of the pin 20b extending into an arcuate slot 18a in the pinion 18, so that there is lost motion in a rotary sense between the pinion 18 and the pinion 20a, to the extent of the length of the arcuate slot 18a.

As best seen in FIG. 3, the crank disk 20c has two laterally extending abutment ears 20c' and 20c'', and also has a pin 20c'''. A torsion spring 20cc wound around the shaft 20 has one end retained by a fixed stud and the other end bears against the pin 20c''' in a direction to urge the crank disk 20c to rotate in a counterclockwise direction when viewed from the front as in FIGS. 1 and 3.

The pinion 20 meshes with external gear teeth 22a on one portion of the periphery of a transmission ring 22 mounted within the camera body for rotation about the optical axis as a center, and held in position by a number of retainers 24. On another part of the periphery of the transmisison ring 22 there are internal gear teeth 22b meshing with a pinion 26 fixed to a short shaft whose forward end has a diametrical coupling tongue 26a engaged in a complementary diametrical coupling groove in the rear end of the tensioning shaft 28 of the shutter unit of the camera, so that rotation of the transmission ring 22 will rotate the pinion 26 and thereby rotate the tensioning or cocking shaft 28 of the shutter.

When the slide 16 is displaced rightwardly from the position shown in FIG. 1, by rotation of the film transport knob 12, this causes clockwise (when viewed from the front as in FIG. 1) rotation of the pinion 18, so that the counterclockwise end of the slot 18a therein engages the pin 20b on the pinion 20a and rotates this pinion also in a clockwise direction, causing counterclockwise rotation of the transfer ring 22, which in turn causes counterclockwise rotation of the pinion 26 and the tensioning or cocking shaft 28 of the shutter. The clockwise rotation of the pinion 20a is accompanied by corresponding clockwise rotation of the crank disk 20c (since the pinion and the disk are both fixed to the same shaft 20) and the parts are held in this tensioned positioned position (against the force of the spring 20cc and various other springs which act on the parts) by a pawl 30 pivoted within the camera body, one end 30a of which engages the latching tooth 20c' on the disk 20c when the parts reach fully tensioned or cocked position as shown in FIG. 3. The other arm 30b of the pawl 30 cooperates with and lies immediately below the lower end of the release button or release plunger 32 mounted in the top wall of the camera. The entire cocking or tensioning movement of the pinion 20a and disk 20c amounts to about one-half of a revolution. When the film winding or transporting movement of the knob 12 is completed, the knob returns to its initial position, and the spring 16b restores the slide 16 leftwardly to its initial rest position illustrated in FIG. 1, the pinion 18 being able to turn back in a counterclockwise direction from the tensioned position to the rest position on account of the length of the arcuate slot 18a, while the parts 20a and 20c remain latched in the tensioned or cocked position on account of the action of the pawl 30 as above described. As above indicated, FIGS. 1 and 3 show all of these parts in their cocked or tensioned position, except the slide 16 and its pinion 18 which have returned leftwardly to their initial position upon the completion of the film feeding operation.

Mounted within the body of the camera is a slide 34 movable transversely (parallel to the motion of the slide 16) and having near its left end (viewed from the front as in FIG. 1) rack teeth 34a meshing with a pinion 36. A restoring spring 34b constantly urges the slide 34 leftwardly to a limit position determined by a stop 34c.

At its right hand end, the slide 34 carries a lever 38 pivoted to the slide on the pin 38a. One arm 38b of this lever is normally held by a spring 38c in contact with a stop pin 34d on the slide 34. The other arm 38e of the lever 38 projects into the path of motion of the pin 20c''' on the crank disk 20c and cooperates with it in a manner described hereafter.

The above mentioned pinion 36, which meshes with the rack teeth 34a on the slide 34, has an elongated hub 36c rotatable on a shaft 40, the rear end of which has a bearing in the camera body at 40a, whereas the hub 36c has a separate bearing in the camera body at 10a. The shaft 40 is parallel to the shaft 20 and to the optical axis of the camera. Two drivers 36a and 36b, in the form of radial abutments, are fixed to the pinion 36 to turn therewith. The driver 36a is just in front of the pinion 36, and has its radial driving edge facing in a counterclockwise direction. It cooperates with and drives a projection 40b on the shaft 40. A torsion spring 40c, one end of which is attached to a fixed point of anchorage, rotatably urges the shaft 40 in a clockwise direction to tend to maintain the projection 40b thereon in contact with the counterclockwise radial face of the driver 36a. The front end 40c' of the shaft 40 is modified to form a coupling dog or diametrical tongue adapted to engage a corresponding diametrical coupling slot in a shaft 42 mounted in the shutter unit as further described hereafter.

The second driver 36b is placed further rearwardly on the hub 36c, at some distance behind the pinion 36. This driver 36b has its radial driving edge facing in a clockwise direction (see FIG. 6) to cooperate with and drive a pin 44a on a helical gear wheel 44 rotatably mounted on the hub 36c and held against axial displacement thereon by conventional means not shown. The helical gear wheel 44 meshes with a second helical gear wheel 46 which is fast on a shaft 48 extending parallel to the focal plane or film plane a little above the cone of rays passing from the lens to the image area or exposure area. The viewing mirror 50 is rigidly mounted on this shaft 48. Tiltably mounted in conventional manner on the same shaft 48 is a flap for covering the film or other light-sensitive layer in the focal plane. This flap is conventional, and the details are not important for purposes of the present invention, so the flap is not shown. It is sufficient to say that it is coupled with the shaft 48 or with the gear wheel 46 in a conventional way so that when the mirror 50 is in the viewing position shown in FIG. 2, at approximately 45 degrees to the optical axis, the flap is in position to cover the picture area on the film, to give additional protection thereto, and when the mirror 50 is swung up through an angle of about 45 degrees from the position shown in FIG. 2, to its ineffective or picture-taking position, the flap swings up through an angle of about 90 degrees to a position close to the mirror, thus uncovering the picture area of the sensitized material and lying in non-obstructing relation to the cone of light rays from the lens to the picture area. The arrangement also includes a spring 50a, one end of which is stationarily anchored, and the other end of which urges the mirror into the operative or viewing position illustrated in FIG. 2.

Figure 5:
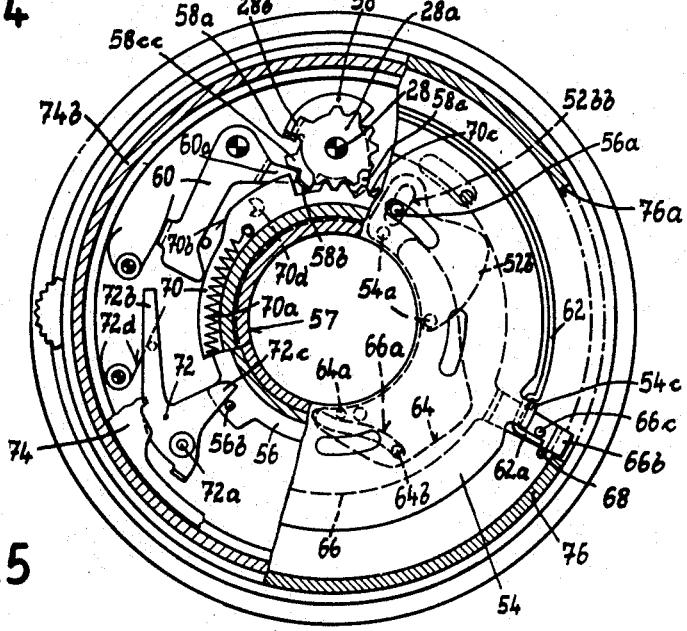
FIG. 5 is a front elevational view of the shutter of FIG. 4, with parts broken away and parts in transverse section.

Secured to the front wall of the main body of the camera is what may be referred to as a shutter unit or objective unit, the main housing of which is indicated in general at 52; see FIGS. 2, 4, and 5. The shutter housing and many of the parts within it may be of conventional form. It includes the usual annular chamber or space 52a containing the actuating and control mechanism for moving the shutter blades 52b, any desired number of such blades being provided. Usually there are about five of these blades 52b, each of them hinged on a pivot pin 54a fixed to a bearing ring 54 which is mounted in the shutter housing for rotation about the optical axis as a center. Each shutter blade has a slot 52bb arranged approximately radially with respect to the pivot 54a, and each of these slots is engaged by a pin 56a on a shutter blade actuating ring 56 mounted for rotation on a bearing shoulder on the front lens tube of the shutter housing, likewise rotating about the optical axis as a center. The shutter blade actuating ring 56 is what is often called in the art simply a blade ring, and will be so referred to for the sake of brevity hereafter.

This arrangement is such that if the bearing ring 54 is kept stationary and the blade ring 56 is turned in a counterclockwise direction (viewed from the front as in FIG. 5) the shutter blades 52b will be opened to the position shown in FIG. 5, and if the blade ring 56 is then rotated clockwise, the blades will be closed so that they collectively close the exposure aperture. This is the action when making an exposure. On the other hand, if the blade ring 56 is held stationary and the bearing ring is rotated in a clockwise direction, this will shift the pivot pins 54a clockwise relative to the now stationary pins 56a, and will open the shutter blades, and counterclockwise rotation of the bearing ring 54 will close the shutter blades. In the present shutter, this is the action occurring when the blades are opened for viewing purposes before and after the actual exposure.

The rotary motion of the blade ring 56, for making an exposure, is imparted to the blade ring by a main drive member 58, usually designated in the art as a "master member." The master member may be of conventional form, so need be described only very briefly. Those wishing more detailed information about the construction of the master member and associated parts, may refer to U.S. Patent 2,785,612 to Singer, granted March 19, 1957 (where the master member is shown at 12), or U.S. Patent 2,943,551 to Gebele, granted July 5, 1960 (where the master member is shown at 18). The master member 58 is rotatably mounted on the tensioning shaft or cocking shaft 28 which extends rearwardly toward the main camera body and is rotated by means of the pinion 26 as already described. The master member is powered by a main driving spring or master spring not here shown, but shown at 16 in said Singer patent and at 20 in said Gebele patent.

Fixed to the shaft 28 near its forward end is a pinion 28a formed with an abutment 28b which entrains a cooperating abutment or ear 58a on the master member 58, when the shaft 28 is turned in a counterclockwise direction (viewed from the front as in FIG. 5) so as to turn the master member similarly in a counterclockwise direction to its cocked or tensioned position, in which it is retained by a latching pawl 60 pivotally mounted on a fixed pivot in the shutter housing and having a latching tooth 60a for cooperation with the clockwise edge of an ear or tooth 58a on the master member 58, to hold the master member latched in the tensioned position, in a manner similar to the action of the latching pawl 42 in said Singer patent or the latching pawl 110 in said Gebele patent. The latching pawl is resiliently urged toward latching position by the usual spring.

The master member 58 also has two driving abutments or teeth 58c and 58cc which cooperate with driving pins on the blade ring 56 in the usual manner. Being conventional, neither the radial extension nor the pins thereon are shown in the present drawings (for the sake of simplicity) but the driving pins are shown at 41 and 43 on the arm 42 in FIG. 3 of the drawings of said Gebele Patent 2,943,551. When the master member 58 runs down in a clockwise direction from its tensioned position toward its rest or run-down position, the tooth 58c thereon will first strike one of the pins on the blade ring and move the blade ring in a counterclockwise direction to open the shutter blades, and then the other tooth 58cc on the master member will strike the other pin on the blade ring to move the blade ring in a clockwise direction to close the shutter blades, all as will be well understood by those skilled in the art, especially in view of the Singer patent and and the Gebele patent above mentioned.

The bearing ring 54 has a rearwardly extending arm 54c retained by the hook-shaped end 62a of a spring 62 which is coiled at least part way around the rear lens tube of the shutter, the other end of the spring 62 being suitably anchored. This spring constantly urges the bearing ring 54 in a counterclockwise direction, hence tends to keep the shutter blades closed so far as the motion of this bearing ring 54 is concerned.

The shutter housing also contains an iris diaphragm having any desired number of leaves 64, five of such leaves being a convenient number. Each of the diaphragm leaves is fulcrumed on a pin 64a of a stationary member 52' in the shutter housing, and also carries a pin 64b which engages a slot 66a in a diaphragm actuating ring 66 suitably mounted for rotation about the optical axis as a center. The slots 66a and the pins 64a and 64b are suitably disposed in known manner to cause the diaphragm leaves to swing on the pins 64a, to open the diaphragm to a wider aperture when the ring 66 is turned in a clockwise direction (viewed from the front as in FIG. 5) and to close the diaphragm down to a smaller aperture when the ring 66 is turned in a counterclockwise direction.

Part of the circumference of the ring 66 is provided with gear teeth which mesh with the teeth of a pinion 42a fixed to or formed integrally with a short shaft 42 which is alined with and driven by the previously described shaft 40 in the camera body.

The ring 66 has a radial arm 66b which carries a pin 66c adapted to make contact with the end 62a of the spring 62, as seen in FIG. 5, when the ring 66 is turned in a clockwise direction. Thus when the shaft 40 is turned in a counterclockwise direction (by the force of the spring 34b moving the slide 34 leftwardly, so that the parts 36 and 36a cause counterclockwise rotation of the shaft) this will rotate the pinion 42a counterclockwise, and rotate the ring 66 clockwise, not only opening the diaphragm leaves 64 to maximum aperture, but also causing the pin 66c to entrain the end of the spring 62 and carry the ring 54 in a clockwise direction to open the shutter blades 52b, for viewing purposes. The extreme clockwise position of these rings 66 and 54 is determined by contact with a stop pin 68, and is the position shown in FIG. 5.

Inside the shutter housing, rotatably mounted on the front lens tube for rotation about the optical axis as a center, is a ring 70, which may be called a release ring or a control ring. A spring 70a, one end of which is attached to a fixed anchorage in the shutter housing and the other end of which is fastened to this ring, urges the ring 70 to rotate in a counterclockwise direction. The ring is provided with a cam edge 70b for engaging and operating a nose on the latching pawl 60, and is also provided with gear teeth 70c which mesh with the teeth of the pinion 28a which is fixed to the shaft 28. Consequently rotation of the shaft 28 will cause rotation (in the opposite direction) of the ring 70. Those skilled in the art will recognize that this ring 70 is similar in some respects, but not entirely, to the control ring 76 in said Gebele patent.

Formed on or fixed to the ring 70 is an abutment, conveniently in the form of a pin 70d which cooperates under certain circumstances with the end 72b of a stop lever or latch lever 72 pivoted on a fixed pivot 72a in the shutter housing. A spring 72d tends to swing the lever 72 clockwise on its pivot, to a position wherein the end 72b lies in the path of travel of the abutment pin 70d. But another arm 72c of the lever 72 is engaged by a pin 56b on the ring 56, when the ring 56 is at the clockwise limit of its motion, to hold the lever 72 in the position shown in FIG. 5, where the end 72b is out of the path of travel of the abutment pin 70d. The blade ring 56 is subject to the action of a conventional blade closing spring (not shown) which tends to turn the blade ring clockwise to close the shutter blades, and this spring is more powerful than the spring 72d so that it swings the lever 72 against the action of the spring 72d.

The operation of the camera disclosed in connection with FIGS. 1-6 of the drawings may be briefly described as follows:

FIGS. 1 and 2 show the control mechanism comprising parts 34, 36, and 40 in the rest or run-down position in which these parts remain both before and after the exposure cycle, although they are displaced from this rest position during the progress of the exposure cycle. In the rest position, the spring 34b keeps the abutment 36b, the pin 44a, the helical gear wheels 44 and 46, and the shaft 48 in a position in which the reflex mirror 50 and the film covering flap are in the path of the light rays, that is, in their effective viewing positions. At the same time, the spring 40c keeps the abutment 36a in contact with the projection 40b to follow up any movement of the parts 42 and 42a and to cause the ring 66 in the shutter housing to keep both the shutter blades and the diaphragm leaves in their fully open or viewing positions as shown in FIGS. 4 and 5. These positions of the parts just mentioned exist irrespective of whether the film has been advanced and the shutter has been cocked or tensioned following the last previous exposure, or whether the film winding and shutter tensioning parts have not been moved since the conclusion of the last previous exposure. The image of the view or scene appears in a conventional manner on the focusing screen 51 of ground glass or the like (FIG. 1) which may be covered by a protective flap 51a when not in use.

When it is desired to take a picture, the operator must first turn the film winding or transporting knob 12 in a counterclockwise direction, in order to wind the previously exposed film out of the focal plane and move a new or fresh area or "frame" of the film into the focal plane or exposure area. The movement of the film winding knob moves the slide 16 to the right from the position shown in FIG. 1, thereby turning the gear 18 clockwise, so that the trailing or counterclockwise end of the slot 18a picks up the pin 20b and thus turns the shaft 20 and the pinion 20a clockwise, turning the transmission ring 22 counterclockwise, likewise turning the pinion 26 and the shaft 28 counterclockwise to cock or tension the master member 58 of the shutter. This does not affect the position of the blade ring 56, but the blades remain fully open because of the position of the ring 54 as controlled by the ring 66 as above explained. When the winding knob 12 is released, the spring 16b will cause the slide 16 to return leftwardly to its initial or rest position, which it can do without causing return motion of the shaft 20 and gear 20a because of the lost motion connection provided by the slot 18a. The shaft 20 and parts connected thereto are latched and retained in the cocked or tensioned position by the latch 30, and in addition the master member 58 is independently latched in cocked or tensioned position by the latch 60. The pinion 28a on the shaft 28, being thus held in its tensioned or counterclockwise position, serves to hold the control ring or release ring 70 in its extreme clockwise position, because of the teeth on the member 28a meshing with the gear teeth on the ring 70.

During the cocking or tensioning action, the clockwise rotation of the shaft 20 has caused corresponding clockwise rotation of the crank disk 20c from its rest position to its tensioned position shown in FIG. 3. During this rotation, the crank pin 20c''' on the disk has slightly deflected the lever 38 on its pivot 38a in a counterclockwise direction thereon, as indicated by the dot-dash lines in FIG. 3, and then has gone beyond the end of this lever so that the lever can snap back past the pin 20c''' under the influence of its spring 38c, so that the pin engages the left edge of the lever in the position shown in full lines in FIG. 3. Of course the film winding motion and tensioning motion carries the shaft 20 and disk 20c slightly beyond the final latched position and then when the film winding pressure is released, the shaft and the disk turn very slightly backwardly until the disk engages the latch 30. Because of the pin 20c''' deflecting and slipping past the lever 38 during this tensioning movement, the tensioning movement does not affect the position of the slide 34 and therefore does not affect the position of other parts controlled by the slide 34, such as the pinion 36, the helical gears 44 and 46, and the mirror 50, with the result that the mirror and the protecting flap remain in viewing position, and the shutter blades and diaphragm leaves remain in fully open viewing position.

The user now adjusts the focusing control or focusing lens mount 77 to focus the lens for the distance to the object to be photographed, adjusts the shutter speed by rotating the conventional external shutter speed control ring 74b which is coupled in the conventional way to the internal shutter speed control cam 74, and selects the desired aperture by rotating a diaphragm selector control ring 76 which has a suitable abutment face 76a for cooperation with the arm 66b of the ring 66, to limit the extent to which the arm 66 can move in a diaphragm-closing or aperture-reducing direction. The aperture selector control 76 may, if desired, take the form of a coupling ring movable in the direction of the optical axis, to be coupled in well known manner to the shutter speed ring 74b for joint rotation therewith in any selected position of orientation with respect thereto, this joint movement of the two rings 74b and 76 serving to change the shutter speed and the diaphragm aperture in a complementary manner without changing the exposure value. When the exposure value is to be changed, the ring 76 may be moved rearwardly against the forward thrust of the small springs shown in FIG. 4, and then may be turned to a new position of orientation with respect to the speed control ring 74b, all as well understood in the art. Neither the details of the coupling nor, in fact, the presence or absence of such a coupling, are important for purposes of the present invention.

When the focusing has been completed and the shutter speed and diaphragm aperture have been set as desired, the camera is, of course, pointed toward the scene to be photographed and the scene is examined in the viewfinder, the image of the scene appearing on the focusing screen 51. The release of the tensioned mechanism, for starting the exposure cycle, is effected by pressing downwardly on the release button or plunger 32, thereby deflecting the latch lever 30 in a counterclockwise direction on its pivot, so that the end 30a thereof releases the tooth 20c' on the crank disk 20c, allowing the crank disk to rotate counterclockwise under the influence of the spring 20cc.

The pin 20c''' on the crank disk 20c entrains the arm 38e of the lever 38 and thus pulls the slide 34 to the right (viewed from the front as in FIGS. 1 and 3) displacing the slide against the resistance of its return spring 34b, since the power of the spring 20cc is greater than the restoring power of the spring 34b. The rightward movement of the slide 34 causes clockwise rotation of the pinion 36 and thus of the abutments 36a and 36b which are rigidly connected to the pinion 36. The clockwise movement of the abutment 36a allows the spring 40c to rotate the shaft 42 in a clockwise direction, thereby similarly turning the pinion 42a (FIG.4) in a clockwise direction when viewed from the front, thereby causing counterclockwise turning of the ring 66 which is controlled by the pinion 42a. This counterclockwise turning of the ring 66 can continue only until the arm 66b on the ring comes in contact with the abutment 76a on the diaphragm aperture selector ring 76, so that the diaphragm leaves 64 are closed down only to the previously selected aperture. The first part of the counterclockwise movement of the ring 66 releases the pressure of the pin 66c on the end 62a of the spring 62, far enough so that the spring 62 can restore the bearing ring 54 in a counterclockwise direction to close the shutter blades 52b.

As soon as the shutter blades have fully closed and the diaphragm has adjusted itself to the aperture selected by the position of the ring 76, the abutment 36b on the hub of the pinion 36 strikes the pin 44a on the helical gear 44, so that continued movement of the pinion 36 in the same clockwise direction will turn the gears 44 and 46 and the shaft 48 to tilt the mirror 50 up to non-obstructing position with respect to the light rays, and simultaneously to tilt the protecting flap up to non-obstructing position. By suitably arranging or orienting the abutments 36a and 36b with respect to the pinion 36, it is insured that the mirror and the cover flap are not tilted out of the path of the light rays until the shutter blades have been completely closed.

As above mentioned, the spring 20cc tends to turn the disk 20c in a counterclockwise direction, and this tendency is assisted by the spring 70a, which acts through the intermediate parts 70, 28a, 28, 26, 22, and 20a. Such counterclockwise turning of the shaft 20 is resisted by the mirror spring 50a, and also by the spring 34b so long as the pin 20c''' remains engaged with the left edge of the lever arm 38e. The combined effect of the springs 20cc and 70a is more powerful than the combined effect of the two springs 34b and 50a taken together. Also, the spring 34b is more powerful than the spring 40c, so that when the slide 34 is released from the pin 20c''', the spring 34b can pull the slide back leftwardly with sufficient force to overcome the contrary effect of the spring 40c.

The actions which control the closing of the shutter blades and the closing down of the diaphragm aperture to the preselected value and the upward tilting of the mirror and the cover flap to an out-of-the-way position, all proceed during an initial idle motion of the crank disk 20c and hence of the control or release ring 70, before the release ring 70 turns far enough to cause the release of the latch 60 of the master member. However, as soon as the closing of the shutter blades and the upward swinging of the mirror and the cover flap have been completed, the parts 20c and 70 have completed their idle rotation, and then further counterclockwise rotation of the control ring or release ring 70 causes the cam 70b thereon to move the latching pawl 60 to throw it out of locking engagement with the tooth 58b on the master member 58. The master member then starts to run down in a clockwise direction, under the influence of its main drive spring or master spring.

This counterclockwise rotation of the blade ring 56 in a blade-opening direction has a slight intitial movement or idle movement, during which the shutter blades still remain overlapped with each other so that no opening has yet occurred. This initial movement is sufficient to carry the pin 56b on the blade ring away from the arm 72c of the lever 72, so that the arm 72b of this lever is now swung rightwardly to a position to intercept the pin 70d on the ring 70, thus temporarily stopping the counterclockwise movement of the ring 70, which in turns stops the movement of the shaft 28 and the parts 22 and 20, so that the pin 20c''' temporarily holds the lever 38 of the slide 34 in the position shown in dotted lines in FIG. 3. Thus the slide 34 is temporarily held approximately at the right hand end of its stroke. Meanwhile, however, the already released or unlatched master member 58 continues its running down motion, to open and close the shutter blades, being retarded, if desired, during the progress of this motion by any conventional retarding mechanism for timing the exposure to the required duration. As the master member drives the blade ring 56 counterclockwise, the shutter blades open (after the short initial or idle movement of the blade ring) and then as the master member drives the blade ring back in a clockwise direction, the blades close to complete the exposure.

The parts 70, 28, 22, and 20 remain in the temporarily stopped position above described, until after the shutter blades have closed. The final part of the clockwise movement of the blade ring 56, after the blades have closed, carries the pin 56b against the arm 72c of the lever 72, swinging the other arm 72b thereof away from the abutment or stop pin 70d, so that the ring 70 may now resume its temporarily interrupted counterclockwise movement under the influence of the springs 70a and 20cc. This permits a slight additional rotation of the shaft 20 in a counterclockwise direction, sufficient to carry the pin 20c''' just beyond the end of the arm 38e of the lever 38, thereby releasing this arm so that the slide 34 can be restored in a leftward direction by the spring 34b. This leftward motion of the slide 34 and the consequent counterclockwise rotation of the pinion 36 relieves the pressure of the abutment 36b against the pin 44a of the helical gear 44, so that the spring 50a can now swing the mirror 50 back to the oblique viewing or light-intercepting position and can swing the protective cover flap back to its protecting position with respect to the film. Likewise the counterclockwise rotation of the pinion 36 causes the abutment 36a to press on the pin 40b to turn the shaft 42 in a counterclockwise direction, thereby turning the ring 66 in a clockwise direction to open the diaphragm leaves to maximum aperture and to open the shutter blades to a fully open position, but as above indicated, the parts are so timed that the shutter blades do not begin to open until the mirror 50 and the protective cover flap have reached their effective positions so that there is no danger of fogging the film.

This action all occurs, of course, much quicker than the time it takes to describe it. It will be seen that after the completion of the exposure, the situation as to viewing the scene is exactly the same as it was before the commencement of the exposure. Therefore, the image on the viewing screen will disappear only during the very brief interval required for completion of the exposure cycle. Both before the exposure and immediately after the exposure, the operator can observe the scene in the viewfinder, regardless of whether he does or does not immediately cock or tension the mechanism for the next exposure. This is a very useful feature because, without having to perform the tensioning operation, the photographer can immediately ascertain whether the photograph he has just taken has included the desired parts of the field of view, and whether it was properly focused.

Figures 7, 8:
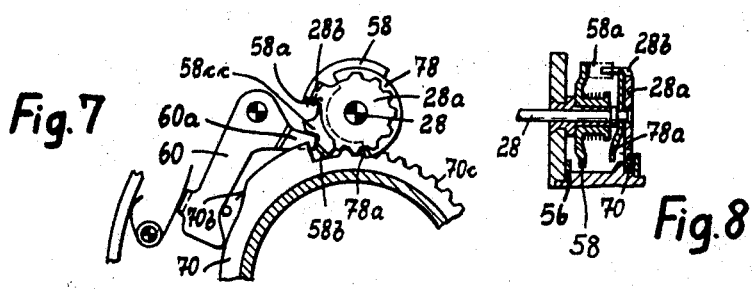
FIG. 7 is a view similar to a fragment of FIG. 5, showing a modification.
FIG. 8 is a detail section through part of the mechanism shown in FIG. 7.

A slightly modified construction is illustrated in FIGS. 7 and 8. Except for the parts specifically mentioned below, the construction may be the same as that already described in connection with FIGS. 1–6.

In this modified form, the abutment pin 70d on the ring 70 is eliminated, and also the lever 72 and pin 56b are eliminated. Instead of these parts, the shaft 28 is provided with an abutment disk 78, rotatable on the shaft between the pinion 28a and the master member 58. This disk 78 has one radial edge for engagement with the downturned ear 28b on the member 28a, and another radial edge or abutment portion 78a for engaging the upstanding ear 58a on the master member 58. The shape of the intermediate member 78 is such that it prevents the member 28a (and consequently the shaft 28) from turning clockwise far enough to release the pin 20c''' from the lever arm 38e, until the master member 58 has swung around far enough to complete the closing of the shutter blades at the end of the exposure. Then and only then can the shaft 28 turn through the last increment of its motion to release the slide 34 so that the mirror 50 and the protective cover flap can swing down to their effective positions. If the master member is retarded during its running down motion, in order to increase the duration of the exposure, it correspondingly retards or delays the clockwise motion of the pinion 28a and shaft 28, so that the shutter blades are always closed before the mirror and the cover flap can swing to effective position, and then (as already explained in connection with the previous embodiment) the mirror and cover flap must reach their effective positions before the shutter blades are again opened for viewing, by motion of the bearing ring 54.

Reference is now made to an alternative construction as illustrated in FIGS. 9–15, this being the preferred construction. In many respects this preferred construction of FIGS. 9–15 is the same as the first construction described in connection with FIGS. 1–6, and the same reference numerals are used for the same parts. It is to be understood that the construction is the same except for those parts specifically mentioned or those differences specifically pointed out below, so that the description of the parts which are essentially the same as in the previously described construction need not be repeated here.

Figure 9:
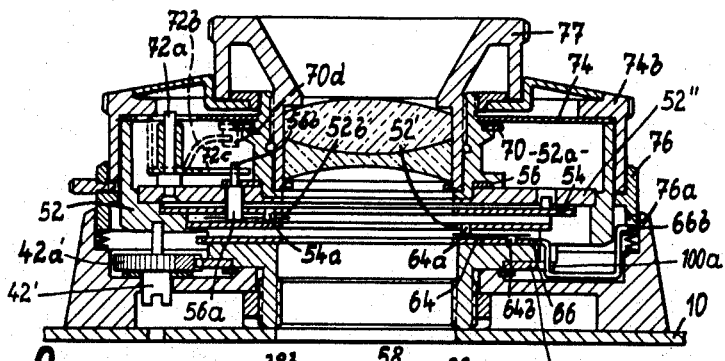
FIG. 9 is a view similar to FIG. 4, illustrating a preferred form of shutter according to the present invention.

Referring first to FIG. 9, the shaft 42 and pinion 42a of the first construction are here replaced by a shaft 42' and pinion 42a'. Just as in the previous construction, the shaft engages and is coupled to the coupling member 40c' at the forward end of the shaft 40 in the camera body. The pinion 42a' meshes with gear teeth on part of the periphery of a ring 100 located in the shutter housing 52 and rotatable about the optical axis as a center. The ring 100 has an arm 100a which engages the arm 66b of the diaphragm actuating ring 66. A spring 100b attached to the arm 100a urges the ring 100 in a counterclockwise direction, and a spring 66b' attached to arm 66b urges the ring 66 in a counterclockwise direction.

Gear teeth on a different part of the periphery of the ring 100 mesh with a pinion 102 (FIGS. 11 and 15) rotatable on a fixed pivot. The pinion, in turn, meshes with and drives a gear wheel 104a mounted on a fixed pivot pin 104. Mounted on the same pivot pin 104 is a driving disk 106 having a radial arm 106a. A pin 104b couples the parts 104a and 106 for common rotation. Also rotatable on the pivot pin 104 is a cam 108 with a peripheral cam edge 108a, and with a pin 108b which is urged into contact with the arm 106a by a torsion spring 110 wrapped around the pin 104 and having one end 110a engaging a fixed stop pin 112 and another end 110b engaging the pin 108b.

Figure 11:
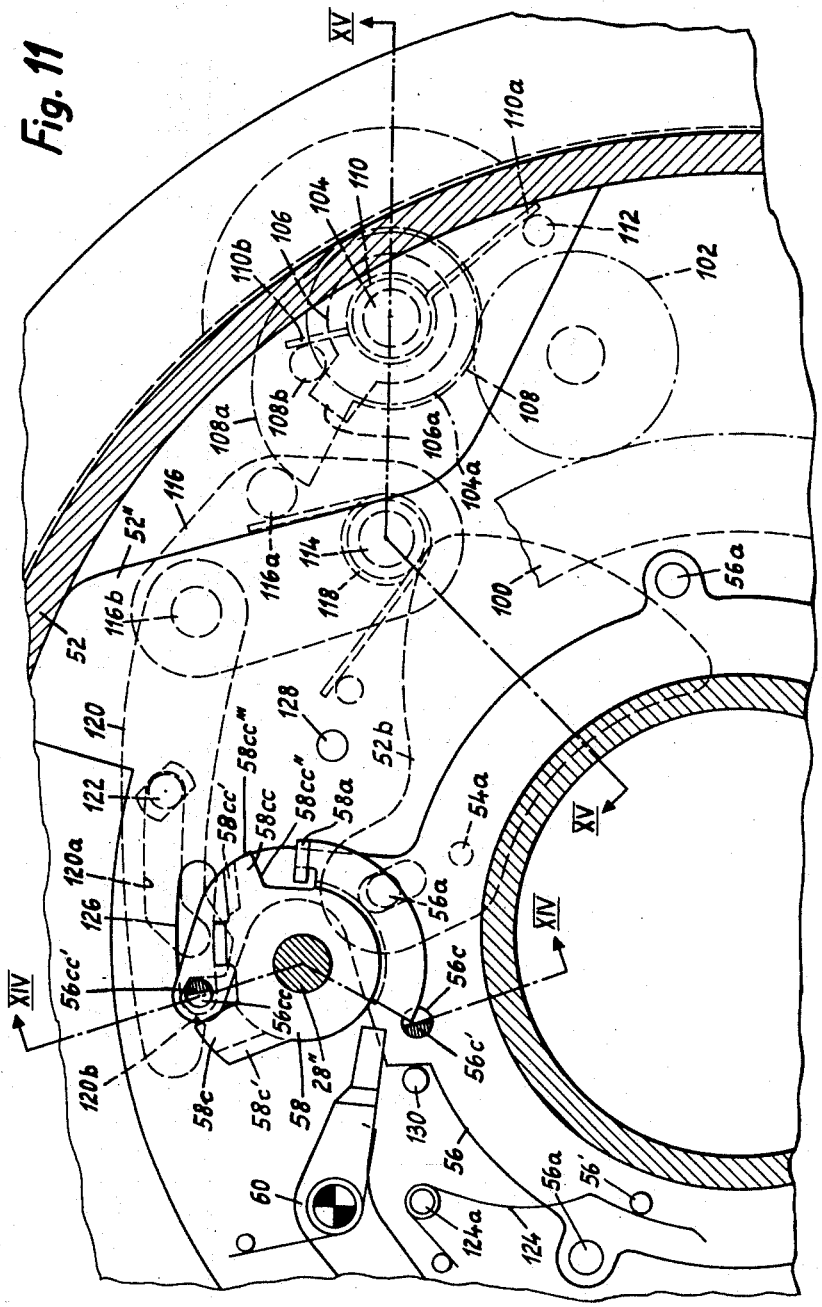
FIG. 11 is a transverse section (perpendicular to the optical axis) of a fragment of the shutter of FIGS. 9 and 10, illustrating additional details, and showing the parts in the run-down or rest position at the conclusion of an exposure and before the mechanism is cocked or tensioned for the next exposure.
Figure 14:
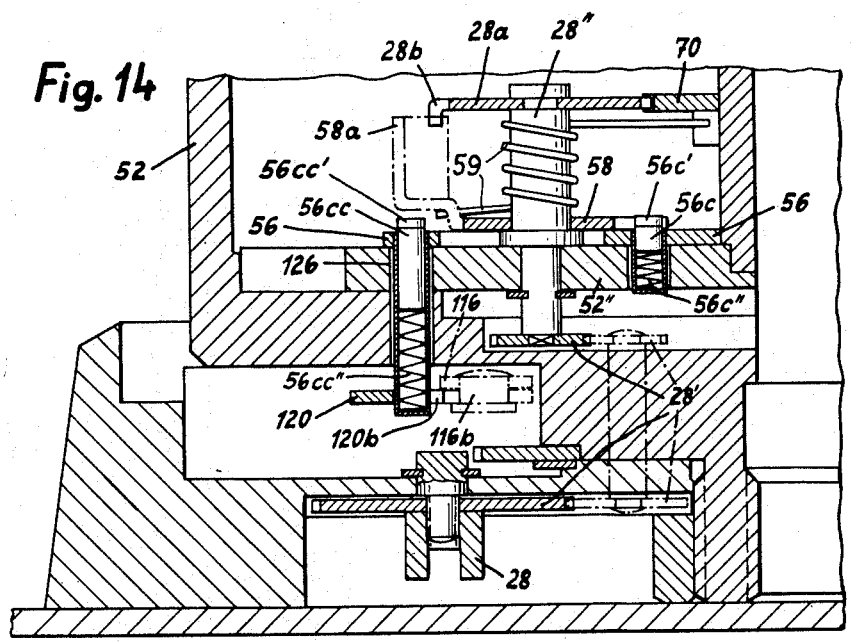
FIG. 14 is a section taken approximately on the line XIV—XIV of FIG. 11.
Figure 15:
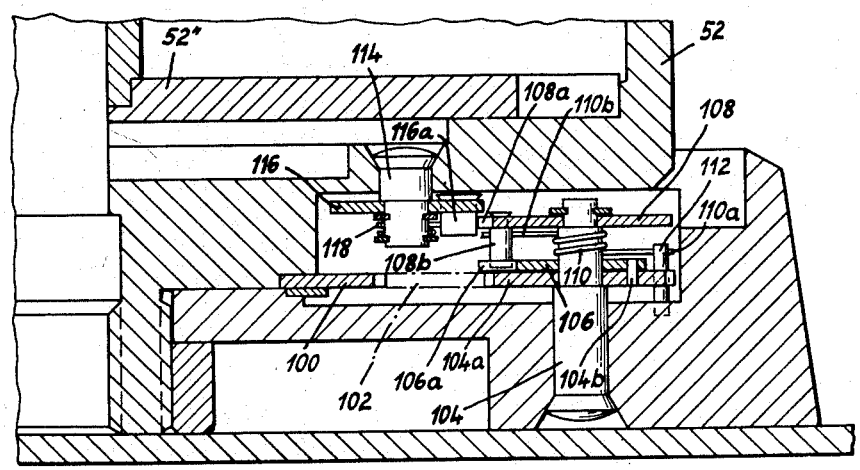
FIG. 15 is a section taken approximately on the line XV—XV of FIG. 11.

Referring still to FIGS. 11 and 15, there is a stationary pivot pin 114 within the shutter housing, on which pin a rockable lever 116 is fulcrumed. A spring 118 wrapped around the pin 114 and having one end pressing against a fixed stop pin and the other end pressing against a pin 116a on the lever 116, tends to swing the lever 116 in a clockwise direction when viewed as in FIG. 11, and to keep the pin 116a in contact with the edge of the cam 108a. A second pin 116b at the opposite end of the lever 116 from the pivot 114, serves for pivotally mounting the righthand end of the pusher link or pusher pawl 120, which extends leftwardly (when viewed as in FIG. 11) from the pivot 116b. A slot 120a in the pusher 120 receives a fixed pin 122 in the shutter housing, to guide the free end of the pusher pawl 120 so as to perform certain motions when the pawl travels in a general longitudinal direction. The free end of the pusher pawl 120 has a notch or claw 120b which engages and cooperates, in a manner to be further described below, with a pin 56cc on the shutter blade ring 56. This pin 56cc projects downwardly through a slot 126 (FIGS. 11 and 14) in the base plate or mechanism plate 52'' within the shutter housing 52, since the blade ring 56 is above this plate 52'' while the pusher link or pawl 120 lies in a plane below this plate 52'', as well seen in FIG. 14.

This pin 56cc may be called the closing pin of the blade ring 56. The blade ring also carries another pin 56c which may be called the opening pin. Both of these pins 56c and 56cc are mounted for limited axial movement in cylindrical cup members or retainers which are firmly fixed in the blade ring 56; see FIG. 14. Springs 56c'' and 56cc'' urge the pins 56c and 56cc, respectively, upwardly to their upward limits of motion, determined by any suitable abutment or stop. Actually it is the cylindrical cup of the pin 56cc which cooperates with the pusher pawl 120, as can be seen in FIG. 14, rather than the pin 56cc itself, but for convenience and simplicity the pusher 120 may be described as acting upon the pin 56cc.

The master spring which powers the master member 58 is shown at 59 in FIG. 14. The master member 58 has an opening arm or opening tooth 58c which, upon rotation of the master member in a clockwise or running-down direction from the tensioned and latched position shown in FIG. 13, engages the opening pin 56c and turns the blade ring 56 in a counterclockwise direction to open the shutter blades for making an exposure. Upon completion of the opening movement, a closing arm or tooth 58cc on the master member engages the closing pin 56cc on the blade ring 56 and moves the blade ring back in a clockwise direction to close the shutter blades to complete the exposure. Upon completion of the closing movement, the operating edge 58cc'' of the closing arm 58cc rides off of the closing pin 56cc, and an arcuate edge 58cc''' concentric with the axis of rotation of the master member remains in engagement with the closing pin 56cc for a moment, long enough to prevent any undesired rebound of the blade ring from fully closed position, and then this arcuate edge 58cc''' continues past the pin 56cc.

The operative ends of the pins 56c and 56cc are partly beveled as seen respectively at 56c' and 56cc', on the sides of these pins which are not engaged by the operating teeth or arms 58c and 58cc of the master member during the running-down movement. These beveled portions of the pins cooperate with correspondingly beveled portions 58c' and 58cc' on the trailing edges of the arms 58c and 58cc, respectively, of the master member 58, so that when the master member is turned counterclockwise during the cocking or tensioning movement, the beveled edges will simply displace the pins 56c and 56cc axially and slide past these pins, if the pins happen to be in positions where they would otherwise interfere with the rotary motion of the master member.

Figure 12:
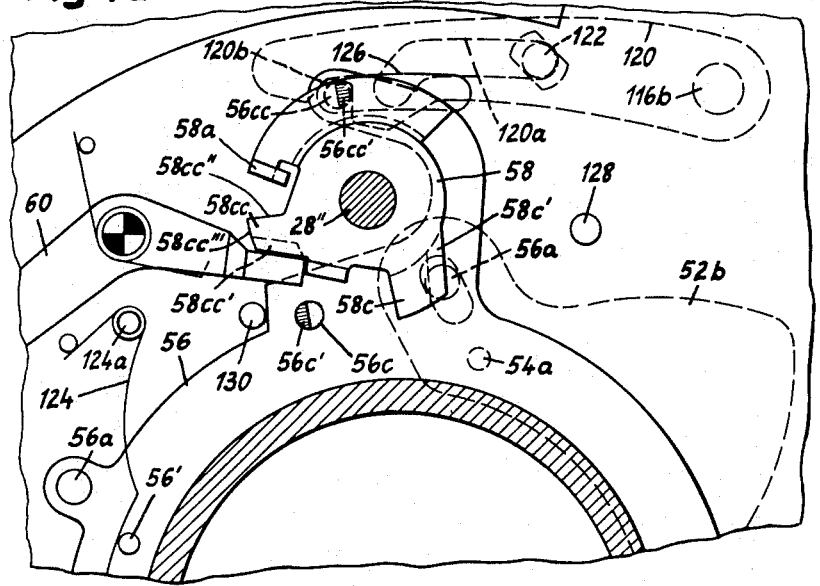
FIG. 12 is a view similar to a portion of FIG. 11, with the parts cocked or tensioned ready for the next exposure, but not yet released to make the exposure.
Figure 13:
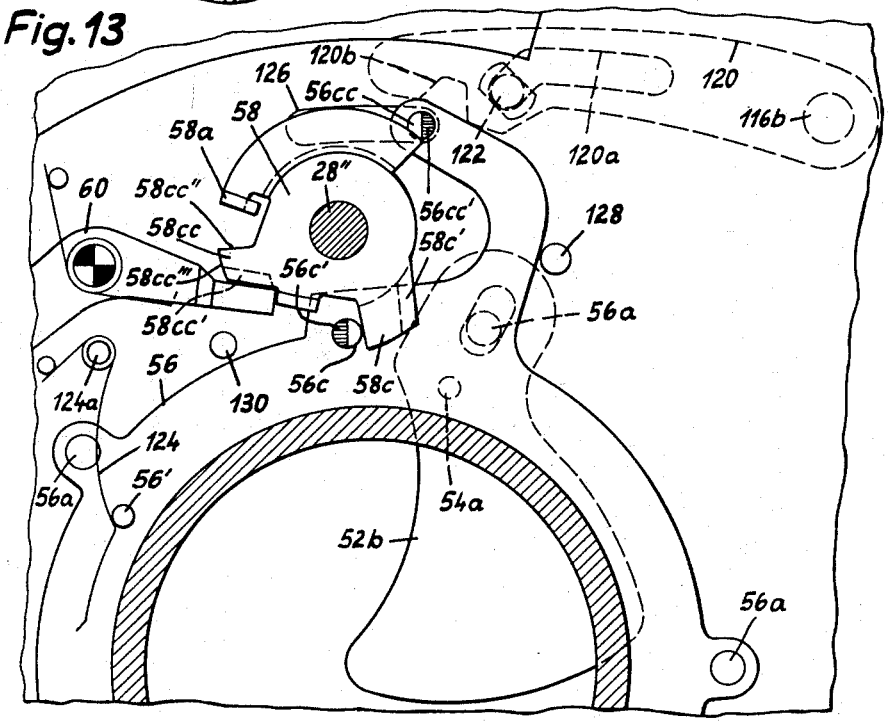
FIG. 13 is a view of the same parts at an intermediate position, after being released to start the exposure cycle but before the master member has been unlatched to open the blades for the actual exposure.

The weak spring 124 coiled around a fixed pin 124a on the base plate or mechanism plate 52'' bears lightly against a pin 56' on the blade ring 56, to tend to hold the blade ring 56 in its maximum clockwise position determined by engagement of the blade ring with a fixed stop pin 128 (see FIG. 13) in which position the blades 52b are fully closed. The opposite extreme or limit position of the blade ring 56 in a counterclockwise direction, wherein the blades are fully open, is determined by engagement of the blade ring with a stop pin 130 (FIG. 12).

In this modified structure, the bearing ring 54, or at least the rotary motion thereof, is eliminated. The pivot pins 54a of the shutter blades can be stationarily mounted. The opening movement of the shutter blades for viewing purposes is accomplished by rotation of the regular blade ring 56, the same blade ring whose movement serves for opening and closing the shutter blades for making the exposure.

Figure 10:
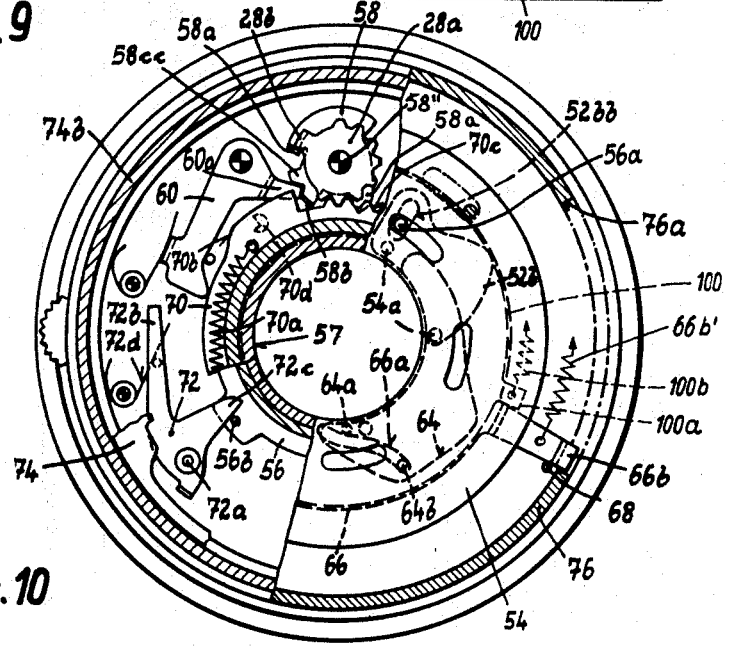
FIG. 10 is a view similar to FIG. 5, illustrating a preferred form of shutter.

The operation of this construction is as follows:

In the position of rest, immediately after a photograph has been taken, the parts are in the positions shown in FIGS. 9, 10, and 11, except that the master member 58 and the associated tensioning member or pinion 28a and ring 70 have not yet been cocked or tensioned and so are still in their run-down or rest postions instead of being in the tensioned or latched positions shown in FIG. 10. The mirror and flap control means in the camera body are in the positions shown in FIGS. 1 and 2, with the mirror and flap in their light-intercepting postions, and the shaft 42' and pinion 42a' are at the counterclockwise limit of their rotation, so that the ring 100 meshing therewith is at its clockwise limit of rotation which is the position thereof shown in FIGS. 10 and 11. In this position, the arm 100a of the ring 100, acting on the arm 66b of the diaphragm ring 66, holds the diaphragm leaves fully open to the widest aperture. At the same time, the ring 100, operating through the members 102, 104a, and 106, has placed the cam 108 in the position shown in FIG. 11, so that the rising edge 108a thereof acts on the pin 116a of the swinging lever 116, to hold the pusher 120 in its leftward position illustrated in FIG. 11, wherein the claw or notch 120b thereof engages the closing pin 56cc (or rather, the cylindrical guide or retainer thereof) to hold the blade ring 56 at the extreme counterclockwise limit of its motion as seen in FIG. 11, the blades 52b of the shutter being fully open for viewing purposes. The image of the scene can thus be observed on the focusing screen 51.

If the user now desires to take another photograph, he turns the film winding or transport knob 12, just as in the first described construction. In a manner similar to that occurring in the first construction, this turns the shaft 28 (or 28'') in a counterclockwise or tensioning direction, so that the tensioning member or pinion 28a serves to turn the master member 58 counterclockwise to its cocked or tensioned position in which it is latched by the latch 60, in the position shown in FIG. 12. The counterclockwise rotation of the tensioning member 28a serves also to turn the release ring or control ring 70 in a clockwise direction to its tensioned position shown in FIG. 10. The parts are now ready for the exposure cycle, which may be initiated whenever the user has properly focused the camera, set the required shutter speed and preselected diaphragm aperture, and chosen the view he desires to take, by observation of the image on the focusing screen 51.

Operation of the release button or plunger 32 (FIGS. 1 and 2) releases the latch 30 of the crank disk 20c so that this disk may rotate in a counterclockwise direction when viewed from the front as in FIGS. 1 and 3, just as in the case of the first construction previously described. This pulls the rack 34 rightwardly, so that the pinion 36 turns clockwise, with consequent clockwise rotation (when viewed from the front) of the shaft 42′ and pinion 42a′, and consequent counterclockwise rotation of the ring 100, partly under the influence of its spring 100b. The counterclockwise motion of the arm 100a on the ring 100 allows the spring 66b′ to move the diaphragm ring 66 in a counterclockwise direction, until the arm 66b comes into contact with the preselected stop 76a, thus setting the diaphragm to the preselected aperture. The counterclockwise rotation of the ring 100 also serves the further purpose of turning the cam 108 in a counterclockwise direction from the position shown in FIG. 11, so that a lower part of the periphery of the cam is opposite the pin 116a on the lever 116, thus allowing the spring 118 of this lever to swing the lever clockwise on its pivot 114, from the position shown in FIG. 11, thus drawing the push link 120 rightwardly from the position shown in FIG. 11 to the position shown in FIG. 13. The claw or notch 120b of the pusher 120 thus draws the pin 56cc on the blade ring rightwardly, to cause clockwise movement of the blade ring 56 to close the shutter blades to the position shown in FIG. 13. Just as the pusher 120 completes its rightward movement, an angular part of the slot 120a comes opposite the fixed pin 122, so that the left end of the pusher 120 is raised upwardly when viewed as in FIG. 13, to the position shown in this figure, to release the pin 56cc from the notch 120b. The weak spring 124 engages the pin 56′ on the blade ring to hold the blade ring with slight force in this closed position in contact with the limit stop 128.

As soon as the shutter blades have been completely closed and the diaphragm has set itself to the preselected aperture, the viewing mirror 50 and the protective cover flap are raised to their ineffective or non-obstructing positions. Just as in the first described construction, these motions of the parts in closing the shutter blades and raising the mirror and protective flap all occur during an initial idle movement of the crank disk 20c and the release ring or control ring 70, before the control ring turns far enough to release the latch 60 of the master member. However, as soon as this initial idle movement is completed, the releasing edge 70b of the control ring (FIG. 10) moves the latch 60 to unlatch the master member 58, which now begins its exposure-making rotation in a clockwise direction from the position it is seen to occupy in FIG. 13. As previously mentioned, the tooth 58c of the master member will engage the pin 56c of the blade ring and move the blade ring in a counter-clockwise direction to open the blades for making the exposure, and as the blades are opened the pin 56b moves away from the arm 72c of the lever 72 (FIG. 10) so that this lever tilts clockwise to bring its other arm 72b into a position to intercept the abutment or stop pin 70d on the release ring or control ring 70, to interrupt temporarily the counterclockwise running down movement of the control ring, just as described earlier in connection with the first construction. This interruption of the movement of the ring 70 causes corresponding interruption of the clockwise running-down rotation of the pinion 28a and shaft 28″, so that the mirror and the cover flap remain in their ineffective exposure-making positions as previously described. However, this temporary interruption of the movement of these parts does not affect the running down movement of the master member 58, so this movement continues in the regular way (retarded, if desired, by conventional retarding mechanism for timing the exposure) and the closing arm 58cc engages the closing pin 56cc of the blade ring 56, to swing the blade ring 56 back in a clockwise direction to close the shutter blades at the conclusion of the exposure.

The actual exposure of the film is now completed, but the exposure cycle continues. The return of the blade ring 56 to its extreme clockwise or blade-closed position causes the pin 56b thereof to engage the lever 72 to move the lever out of the path of the abutment 70d of the ring 70, so that the release ring 70 can now resume its counterclockwise motion under the influence of its spring 70a. This ring therefore continues its motion to its completely run down or rest position, thus turning the shaft 28″ (or allowing it to turn) clockwise to its completely run down position, which in turn allows the slide 34 to move a little further to the right from the dotted line position shown in FIG. 3, so that the pin 20c‴ of the disk 20c can slip off the end of the lever arm 38e, and the slide 34 is then free to return to its initial run down position under the influence of its spring 34b. Consequently the mirror and the protective flap will automatically be tilted back to their effective or light-intercepting positions, and when they have reached these positions the slight additional rotation of the shafts 40 and 42 and 42′ will move the ring 100 back to the position shown in FIG. 10, opening the diaphragm to maximum aperture and turning the cam 108 to the position shown in FIG. 11, so that the high point thereof displaces the lever 116 to the left, causing the pusher 120 to move to the left to engage the pin 56cc on the blade ring and thereby open the shutter blades for viewing.

Thus in this construction, just as in the construction first described, the viewfinder mechanism is effective immediately at the completion of the exposure, as well as before. The operator does not have to tension the shutter or wind the film again before he can use the viewfinder, as he does have to do in many prior cameras of this same general type. The user can see the image of the scene on the focusing screen right up to the moment of the actual film exposure, and also immediately after the exposure. The image disappears only for the very brief duration of the actual exposure itself.

The shape of the cam 108 is suitably designed to time the kinematic actions in the camera and in the shutter housing correctly. As seen in FIG. 11, the effective edge of the cam has an initial section of constant radius, and then has a radial rise in a second section of the cam.

The reopening of the shutter blades 52b for viewing after the conclusion of the actual exposure, presupposes that the blade ring 56 is released from the master member 58 at the conclusion of the exposure. This is actually the case in the present construction. As already briefly mentioned, in the closing part of the movement of the master member, the closing arm or tooth 58cc thereon engages the pin 56cc to move the blade ring to closed position, and then passes on beyond the pin. As the tooth 58cc slips past the pin, the arcuate end 58cc‴ of the tooth momentarily holds the pin against any undesired rebound from the limit stop 128, and then this end of the tooth also slips past the pin, freeing the pin completely so that the blade ring may turn counterclockwise to open the blades for viewing under the influence of the pusher 120. The master member stops in the completely run down or rest position shown in FIG. 11, where it is seen that the closing tooth 58cc has passed entirely beyond the path of movement of the pin 56cc, while the opening tooth 58c has stopped before it reached the extreme counterclockwise limit of the pin 56cc, so the master member does not obstruct the opening-for-viewing movements of the blade ring. When the master member is wound or tensioned, the beveled surfaces on the rear edges of the arms 58c and 58cc cooperate with the bevels on the ends of the pins 56c and 56cc as already briefly mentioned, to displace these pins axially so that the master member may slip by them during the tensioning operation. In FIG. 11, a corner of an arcuate flange on the master member appears to be in contact with the pin 56c, but this arcuate flange is actually in a plane above the upper end of the pin 56c (as can be seen from FIG. 14) and so does not interfere in any way.

Depending upon the exact location of the various operating parts in the shutter housing, the rotary shaft of the master member and of the tensioning pinion 28a can be integral with the shaft 28 which extends to the back of the shutter housing, or it can be offset from the shaft 28 if necessary to the desired location of the parts in the housing. An offset construction is indicated somewhat schematically in FIG. 14, where the master member shaft 28″ is offset from the shaft 28, and is operatively connected to turn therewith by intermediate transmission gears 28′.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera of the single lens reflex type having a shutter with movable blades and a blade ring movable to shift the blades between an open position and a closed position and operating mechanism movable from a tensioned position to a rest position and effective during such movement to move said blade ring to open and then to close said blades for making an exposure, said camera also having a viewing mirror movable between an ineffective position during an exposure and an effective viewing position both before and after an exposure, characterized by a crank disk rotatable in one direction to move said operating mechanism of the shutter from rest position to tensioned position and rotatable in the opposite direction to release said operating mechanism for running-down movement toward rest position to make an exposure, a slide coupled with the crank disk for one-way entrainment thereby, a cam, a spring tending to turn said cam in one direction, an entraining element operatively connected to said slide to move therewith, for turning said cam against the action of said spring, a lever mounted for pivotal movement, a cam follower portion on said lever for engaging said cam so that the position of said lever is determined by the position of said cam, a pusher pawl carried by said lever, and a pin and slot connection for guiding said pusher pawl as said pawl is moved by movement of said lever caused by movement of said cam, said pusher pawl during its movement in one direction engaging said blade ring to open said shutter blades for viewing purposes, separately from the opening thereof by said operating mechanism when making an exposure.

2. A photographic camera of the single lens reflex type having a shutter with movable blades and a blade ring movable to shift the blades between an open position and a closed position and operating mechanism movable from a tensioned position to a rest position and effective during such movement to move said blade ring to open and then to close said blades for making an exposure, said camera also having a viewing mirror movable between an ineffective position during an exposure and an effective viewing position both before and after an exposure, characterized by a crank disk rotatable in one direction to move said operating mechanism of the shutter from rest position to tensioned position and rotatable in the opposite direction to release said operating mechanism for running-down movement toward rest position to make an exposure, a slide coupled with the crank disk for one-way entrainment thereby, a cam, a spring tending to turn said cam in one direction, an entraining element operatively connected to said slide to move therewith, for turning said cam against the action of said spring, a lever mounted for pivotal movement, a cam follower portion on said lever for engaging said cam so that the position of said lever is determined by the position of said cam, a pusher pawl having one end pivotally mounted on said lever and having a notch at its other end, a cam shaped slot in said pusher pawl, and a fixed pin engaging said slot to guide said other end of said pawl so that said notch will engage a pin on said blade ring as said pawl is moved in one direction by said lever, to turn the blade ring to open said shutter blades for viewing purposes, and so that said notch will disengage said pin as said pawl is moved back in the opposite direction by said lever, after closing the shutter blades.

3. A photographic camera of the single lens reflex type having a shutter with movable blades and a blade ring movable to shift the blades between an open position and a closed position and operating mechanism movable from a tensioned position to a rest position and effective during such movement to move said blade ring to open and then to close said blades for making an exposure, said camera also having a viewing mirror movable between an ineffective position during an exposure and an effective viewing position both before and after an exposure, characterized by a crank member rotatable in one direction concomitantly with movement of said operating mechanism from rest position to tensioned position and rotatable in the opposite direction during an exposure cycle, a first spring tending to rotate said crank member from its tensioned position to its rest position, a first releasable latch for holding said crank member in its tensioned position against the force of said first spring, a slide movable between a rest position and a tensioned position, a second spring tending to move said slide from its tensioned position toward its rest position, cooperating one-way entraining parts on said crank member and said slide for moving said slide from its rest position to its tensioned position by movement of said crank member from its tensioned position to its rest position and for releasing said slide from entrainment near the end of movement of said crank member to rest position so that said second spring may then return said slide to its rest position, an operative connection between said slide and said mirror whereby said mirror is in effective viewing position whenever said slide is in its rest position and said mirror is in ineffective exposure-making position whenever said slide is moved a predetermined distance away from its rest position, a rotary cam controlled by said slide, a pusher member operatively connected to said cam to be moved thereby, and a claw on said cam for engaging said blade ring and moving said blade ring to open the shutter blades for viewing during predetermined rotary movement of said cam in a first direction and for moving said blade ring to close the shutter blades and then disengaging from the blade ring during predetermined rotary movement of said cam in a second opposite direction, the rotary movements of said cam being so related to the movements of said slide that when said slide moves from rest position toward its tensioned position, said predetermined movement of said cam in said second direction occurs before said mirror is moved from effective viewing position to its ineffective position, and when said slide moves from its tensioned position toward its rest position, said predetermined movement of said cam in its said first direction occurs only after said mirror is moved from its ineffective position back to its effective viewing position.

4. A construction as defined in claim 3, in which said camera includes a main camera body and a shutter unit mounted on and projecting from said body, and in which said crank member and said slide are mounted within said main camera body, and said cam, said pusher member, and said blade ring are mounted within said shutter unit.

5. A photographic shutter construction including shutter blades, a blade ring operatively connected to said blades and mounted for rotation in a first direction to open the blades and for rotation in a second direction to close the blades, an opening pin on said blade ring, a closing pin also on said blade ring, and a master member mounted for tensioning movement in one direction for exposure-making movement in an opposite direction, said master member being effective during its exposure-making movement to engage said opening pin to move said blade ring in its first direction and then to engage said closing pin to move said blade ring in its second direction, characterized by the provision of a claw member movable in a generally peripheral direction with respect to said blade ring, and a part on said claw member for engaging said closing pin upon movement of said claw member in one peripheral direction to move said blade ring in said first direction to open said blades separately from movement of said master member and for engaging said closing pin upon movement of said claw member in an opposite peripheral direction to move said blade ring in said second direction to close said blades separately from movement of said master member.

6. A construction as defined in claim 5, in which said closing pin includes an axially fixed tubular portion for engagement with said claw member and an axially movable portion movable partly within said tubular portion for engagement with said master member.

7. A photographic shutter construction including shutter blades, a blade ring operatively connected to said blades and mounted for rotation in a first direction to open the blades and for rotation in a second direction to close the blades, and a master member mounted for tensioning movement in one direction and for exposure-making movement in an opposite direction, said master member being effective during its exposure-making movement to turn said blade ring first in its said first direction and then in its second direction, characterized by the provision of a rotatable cam, a pivoted arm controlled by said cam, a pusher link having one end pivotally connected to said arm and an opposite end adapted to engage with and disengage from a part of said blade ring, and means for guiding said opposite end of said link so that when said cam is turned in one direction to move said arm and said link in one direction, said opposite end of said link will engage with said blade ring and move said blade ring in its said first direction to open said blades without movement of said master member, and so that when said cam is turned in an opposite direction to move said arm and said link in an opposite direction, said opposite end of said link will move said blade ring in its said second direction to close said blades and will then disengage from said blade ring to free said blade ring for movement by said master member.

References Cited in the file of this patent
UNITED STATES PATENTS

| 2,730,025 | Faulhaber | Jan. 10, 1956 |
| 3,062,118 | Starp | Nov. 6, 1962 |
| 3,074,333 | Hahn | Jan. 22, 1963 |